United States Patent [15] 3,691,538
Haney et al. [45] Sept. 12, 1972

[54] SERIAL READ-OUT MEMORY SYSTEM

[72] Inventors: Ralph D. Haney, Dayton; Nicholas E. Aneshansley, Centerville, both of Ohio

[73] Assignee: The National Cash Register Company, Dayton, Ohio

[22] Filed: June 1, 1971

[21] Appl. No.: 148,596

[52] U.S. Cl.........340/173 SP, 340/173 R, 340/166 R
[51] Int. Cl...............................................G11c 17/00
[58] Field of Search..........340/173 R, 173 SP, 166 R

[56] References Cited

UNITED STATES PATENTS

| | | | |
|---|---|---|---|
| 3,523,284 | 8/1970 | Washizuka | 340/173 RC |
| 3,613,055 | 10/1971 | Varadi | 340/173 SP |

*Primary Examiner*—Terrell W. Fears
*Attorney*—Louis A. Kline

[57] ABSTRACT

There is disclosed a read-only memory system which is constructed from integrated circuits. Each integrated circuit is responsive to a serial-by-bit address signal and provides a serial-by-bit output signal. Each integrated circuit includes an address and an output register, a read-only memory matrix, and integrated circuit select logic.

10 Claims, 1 Drawing Figure

PATENTED SEP 12 1972 3,691,538
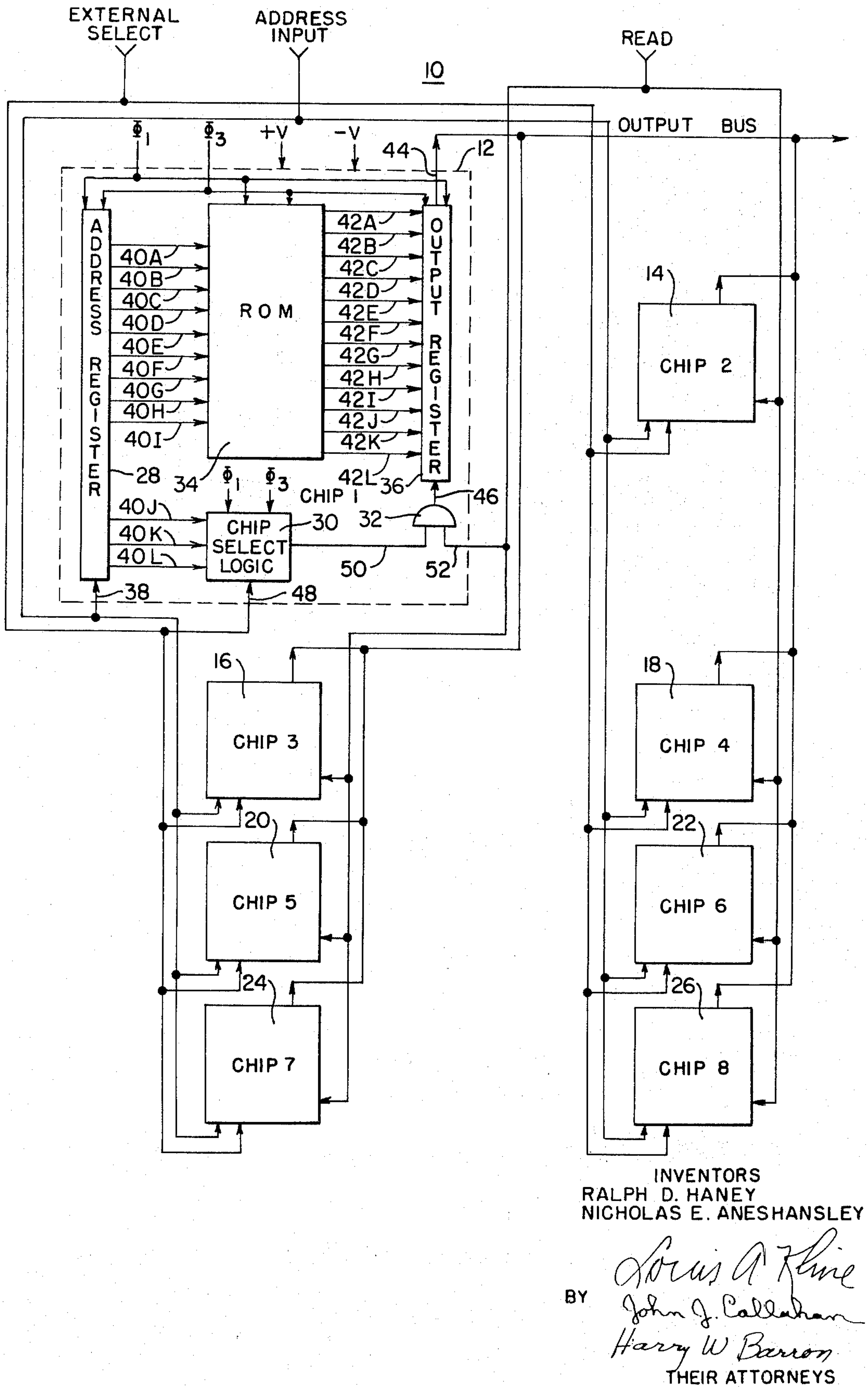
INVENTORS
RALPH D. HANEY
NICHOLAS E. ANESHANSLEY
BY Louis A. Kline
John J. Callahan
Harry W. Barron
THEIR ATTORNEYS

SERIAL READ-OUT MEMORY SYSTEM

This invention relates to a read-only memory and, more particularly, to a read-only memory for use in a system which operates in a serial-by-bit arrangement.

Most digital integrated circuits are designed for maximizing speed of the system into which they are to be included. For instance, a read-only memory is designed to provide the contents read therefrom in a parallel-by-binary digit (bit) manner in response to an address signal applied thereto in a parallel-by-bit manner. Thus N bits of a given word of contents are provided simultaneously on N different output lines in response to the M bits of address provided on M different input lines. In an integrated circuit, this requires N output couplings, each of which includes a driver amplifier, an output pad, and means for connecting the output pad to a pin lead in the package and M input couplings each of which requires an input pad and means to couple the input pad to a pin lead in the package.

The greater the number of input and output couplings required in any given integrated circuit, the higher the cost of that circuit. The cost increases because of the expense of making the connection from the package to the pad. Further, it increases because one of the prime causes of integrated circuit failures is failure of this connection, and a bad integrated circuit increases the per unit cost of the remaining integrated circuits. Further, the amount of area required for each driver amplifier, output pad, and input pad is considerable, and results in less digital electronics being able to be placed on a given size integrated circuit. This, in turn, increases system cost because additional integrated circuits will be necessary to make up for the loss of this digital electronics.

In a high-speed digital system, the above problems are acceptable to achieve the speed required. However, in some systems, speed is limited by an external factor, such as a human operator. For instance, in the retail sales terminal system described in U.S. patent application Ser. No. 71,971, filed Sept. 14, 1970, in the names of James E. Zachar and Walter E. Srode, Jr., as Inventors, and entitled "Retail Terminal", the speed of the system is limited by how fast an operator can depress the keys of the keyboard. There, high-speed parallel operation is unnecessary because of the operator limitation as to speed, and the system was designed to operate in a serial-by-bit manner. However, in the central processor of that system, which is described in more detail in U.S. patent application Ser. No. 72,084, filed Sept. 14, 1970, in the names of Ralph D. Haney, James E. Zachar, and Charles J. Drozd as Inventors, and entitled "Digital Processor", a parallel-by-bit address signal and a parallel-by-bit output signal are used for the operation of the read-only memory of the system. This is in accordance with the state-of-the-art suggestions. It should be noted in reference to the Haney et al. U.S. patent application that the read-only-memory system includes twenty-four integrated circuit devices. One reason so many integrated circuit devices are required is that there are eleven parallel address signal inputs and eight parallel output signal outputs for each device. The outputs are all applied to an external parallel-to-serial converter to obtain a serial-by-bit signal, and the inputs all are received from a circulating counter. If one could utilize an integrated circuit device which was responsive to serial-by-bit address signals and provided serial-by-bit output signals, a considerable saving could be realized because of the elimination of all but one input and all but one output coupling means. This saving is realized by increasing the amount of digital electronics on each device, and, hence, fewer devices are required, and by decreasing the number of input and output couplings required.

In accordance with one preferred embodiment of this invention, there is provided a memory system responsive to a coded multibit serial address signal for providing, on command of a read signal, a multibit serial output signal which represents the contents stored at the location specified by said address signal. This read-only memory system comprises a plurality of integrated circuit devices each of which includes a clocked address serial-to-parallel converter, a clocked output parallel-to-serial converter, a matrix circuit, and device decoding logic means responsive to a unique coded arrangement of bits. The address converter is responsive to the address signal being applied thereto one bit at a time, so that, after a predetermined time, the address signal is provided in parallel by the address converter. A first preselected portion of the bits of the parallel provided address signal is applied to the matrix, and a second preselected portion of the bits of the parallel provided address signal is applied to the device decoding logic means. The first preselected portion of bits are applied to the matrix to cause a parallel multibit matrix signal to be provided from the matrix to the output converter. The second preselected portion of bits are applied to the device decoding logic means to cause the device decoding logic means to provide an enabling signal when the read signal occurs in the event the code of the second preselected portion of bits is unique to that particular device decoding logic. The enabling signal is applied to the output converter to cause the matrix signal then being applied to be serially provided as the memory system output signal.

A detailed description of a preferred embodiment of this invention is hereinafter given with reference to the single FIGURE, in which a serial-by-bit read-only memory system is shown.

The read-only memory system 10 includes eight identical integrated circuit devices 12, 14, 16, 18, 20, 22, 24, and 26. For the sake of brevity, only the device 12 will be described in detail, it being understood that the remaining devices are identical. The device 12 includes a package into which an integrated circuit chip is inserted. The chip includes an address shift register 28, chip select logic means 30, an AND gate 32, a matrix-type read-only memory 34, and an output shift register 36.

The integrated circuit chip of the device 12 is a conventional metal-oxide semiconductor (MOS) integrated circuit. It includes a silicon substrate of one conductivity, a plurality of diffused regions of opposite conductivity, thick and thin layers of silicon oxide material, and metal material. The chip is placed in an eight pin package to form the device 12; seven input signals are applied thereto, and one output signal is derived therefrom. The input signals are an "address input" signal, an "external select" signal, a "read" signal, a clock phase 1 ($\phi_1$) signal, a clock phase 3 ($\phi_3$) signal, a positive voltage (+V), and a negative voltage (−V). These input signals are all also applied to each of the devices 14, 16, 18, 20, 22, 24, and 26, although for the sake of clarity the $\phi_1$, $\phi_3$, +V, and −V signals are not shown as being applied to devices other than the device 12.

The device 12 also includes means (not shown) responsive to the $\phi_1$ and $\phi_3$ clock signals for providing $\phi_2$ and $\phi_4$ clock signals. Each of the $\phi_1$, $\phi_2$, $\phi_3$, and $\phi_4$ clock signals is applied to the address register 28, the chip select logic 30, the read-only matrix 34, and the output register 36. The address and output registers are conventional four-phase MOS shift register circuits, like that described in United States patent application Ser. No. 21,150, filed Mar. 19, 1970, in the name of Jack O. Field as Inventor, and entitled "Input and Output Circuitry." The address register 28 has a single serial input 38 and 12 parallel outputs 40A–40L. The "address input" signal is a 12 bit serial-by-bit signal and is applied to the input 38. Once each clock cycle, a new bit is applied to input 38, and the bits previously applied thereto are shifted one position. Thus, 12 clock cycles after the first address input signal bit is applied to the input 38, the "address input" signal will appear as a parallel signal at the outputs 40A–40L.

The "address input" signal is divided into two portions, the first of which includes the first nine bits and the second of which includes the last three bits. The first portion of the "address input" signal appears at the address register outputs 40A–40L, and these outputs are coupled to nine corresponding parallel inputs to the read-only memory matrix 34. The matrix 34 is a 512 × 12 bit matrix; that is, it stores 512 12-bit words. There are 512 unique codes possible on the nine outputs 40A–40L ($2^9 = 512$), so the first nine bits of the address input signal will define which of the 512 words of the matrix 34 is to be selected. The manner of decoding these nine input lines to arrive at the desired word is conventional and will not be described in detail herein. This selected word appears in a parallel-by-bit form on the matrix 34 outputs 42A–42L.

The outputs 42A–42L are applied to twelve corresponding parallel inputs of the output register 36. The output register 36 is a 12 stage four phase MOS shift register and is similar to the address register 28. However, it further includes conventional inhibit means to prevent the input signals applied thereto from being shifted to the output 44 thereof until an "enabling" signal is applied to an enable input 46 of the output register 36. This signal will be applied during the time when the address register 28 contains all 12 bits of the "address input" signal. If the "enabling" signal were applied at any other time, an undesired word would be applied to the output register 36, since the desired code on the outputs 40A–40I would not be occurring.

In order to increase the size of the read-only memory system 10 above the 512-word limit of the matrix 34, the chip select logic 30 and the AND gate 32 are provided. The last three bits of the "address input" signal will be appearing at the outputs 40J–40L at the time the entire address input signal is in the address register 28. These last three bits will form a three bit code which designates one of the eight integrated circuit devices 12, 14, 16, 18, 20, 22, 24, and 26. The chip select logic 30 will be designed to respond to one of the eight codes, and each of the chip select logic circuits in the other devices will respond to a different one of the eight codes. In this manner, the size of the read-only memory system 10 can be increased to 4,096 12-bit words.

An "external select" signal is provided to allow further expansion of the read-only memory system 10. This may be accomplished by providing additional groups of devices such as shown in the FIGURE and designating each group of eight devices as a page. Each page will be responsive to a different "external select" signal. This signal is applied to the chip select logic of each device of the page with which it is associated, as at the input 48 of the chip select logic 30 of the device 12. Unless the "external select" signal is provided, the chip select logic circuits of the entire page are inhibited. Thus, the size of the read-only memory system 10 can be expanded to N × 4,096 12-bit words, where N is the number of pages.

Assuming that the "external select" signal is applied to the chip select logic 30 in the device 12 and that the chip select logic 30 is responsive to the code appearing at the outputs 40J–40L of the address register 28, a "chip decode" signal will appear on the line 50. This signal is applied to one input of the AND gate 32, and the other input of the AND gate 32 is connected through the line 52 to the "read" signal. The "read" signal is provided by means (not shown) external to the read-only memory 10 at the time the entire "address input" signal is provided at the outputs 40A–40L of the address register 28. When a coincidence occurs between the "chip decode" signal appearing on the line 50 and the "read" signal appearing on the line 52, the "enabling" signal appears at the enable input 46, and the output register 36 shifts the parallel signal then applied thereto from the matrix 34 outputs 42A–42L. In this manner, a serial-by-bit output signal is provided to the output bus through the output 44.

If an integrated circuit device other than the device 12 had been selected, the "chip decode" signal on the line 50 would not have occurred, and no "enabling" signal at the enable input 46 of the output register 36 would be present. Thus, no output signal would be applied to the output 44. However, the output of the device selected would provide an output signal to the output bus.

What is claimed is:

1. A memory system responsive to a coded multibit serial address signal for providing, on command of a read signal, a multibit serial output signal which represents the contents stored at the location specified by said address signal, said system comprising:

a plurality of integrated circuit devices, each of which includes a clocked address serial-to-parallel converter, a clocked output parallel-to-serial converter, a matrix circuit and device decoding logic means responsive to a unique coded arrangement of bits, said address converter being responsive to said address signal being applied thereto one bit at a time so that, after a predetermined time, the address signal is provided in parallel by said address converter, a first preselected portion of the bits of said parallel provided address signal being applied to said matrix and a second preselected portion of the bits of said parallel provided address signal being applied to said device decoding logic means, said first preselected portion of bits being applied to said matrix and causing a parallel multibit matrix signal to be provided thereby to said output converter, said second preselected portion of bits being applied to said device decoding logic means and causing said device decoding logic providing an enabling signal when said read signal occurs in the event the code of said second preselected portion of bits is unique to that particular device decoding logic, said enabling signal being applied to said output converter to cause the matrix signal then being applied thereto to be serially provided as said memory system output signal.

2. The invention according to claim 1:

wherein said clocked address serial-to-parallel converter is a multistage shift register having a serial input and a plurality of parallel outputs, said address converter being responsive to a clock signal applied thereto so that, each time a bit of said address signal is applied thereto, all bits of said address signal previously applied thereto are shifted one stage away from said serial input; and wherein said clocked output parallel-to-serial converter is a multistage shift register having a plurality of parallel inputs to which are applied said parallel multibit matrix signal, an enabling input, and a serial output at which said multibit serial output signal appears, said output converter being responsive to a clock signal whenever said enabling signal is provided to said enabling input to serially shift the parallel matrix signal applied thereto and cause said parallel matrix signal to be applied as said multibit serial output signal.

3. The invention according to claim 2 wherein said enabling signal is provided after a certain number of address signal bits have been applied to said address converter.

4. The invention according to claim 3 wherein the first and second portions of said address signal are applied to said serial input of said address converter in a relationship such that, at a certain time, said entire first portion is applied to said matrix and said entire second portion is applied to said decoding logic, said read signal occurring at said certain time.

5. The invention according to claim 4 wherein each device decoding logic means includes means to provide a decode signal in the event that the code of said second portion of said address signal applied to said address register on the same integrated circuit device therewith is a preselected value, said preselected value being uniquely different for the device decoding logic means of each integrated circuit device, said enabling signal being applied, at the time said read signal occurs, to the output converter on the integrated circuit device containing the device decoding logic means providing decode signal.

6. The invention according to claim 5 wherein the coincident occurrence of said decode signal and said read signal causes said enabling signal to be provided.

7. A read-only memory system responsive to a coded serial-by-bit address signal provided to an address line for providing a serial-by-bit output signal to an output line, said address signal including a first number of matrix address bits and a second number of device select bits, said output signal being provided upon command of a read signal appearing on a read line, said system comprising:

first and second integrated circuit devices each having address shift register means, output shift register means, device select decoding means, and matrix means, said address shift register means having a serial input and a plurality of parallel outputs and being responsive to a serial-by-bit signal applied to said serial input thereof to provide a corresponding parallel-by-bit signal at said plurality of outputs thereof, said output shift register means having a plurality of parallel inputs, an enable input, and a serial output and being responsive to the application of parallel-by-bit applied to said plurality of inputs thereof and a coincidentally applied enabling signal to said enabled input thereof to provide a corresponding serial-by-bit signal at said serial output thereof, said matrix means including a plurality of parallel inputs and a plurality of parallel outputs, a first portion of said parallel outputs of said address shift register means being coupled to said matrix means inputs, said matrix means outputs being coupled to said parallel inputs of said output shift register means, said matrix means, in response to the then occurring particular parallel signal provided at said first portion of address shift register means parallel outputs providing a unique contents signal to said parallel outputs thereof, said device select decoding means having a read signal input and a plurality of parallel inputs coupled to a second portion of the parallel outputs of said address shift register, said device select decoding means providing said enabling signal upon each occurrence of said read signal in the event the code of the parallel signal applied to the parallel inputs thereof is a certain value which is different for each device select decoding means of each integrated circuit device;

means for coupling said address line to the serial input of the address shift register means of each of said integrated circuit devices;

means for coupling the serial output of the output shift register means of each of said integrated circuit devices to said output line; and means for coupling said read line to the read signal input of the device select decoding means of each of said integrated circuit devices.

8. The invention according to claim 7 wherein each device select decoding means includes decoding logic and gating logic, said decoding logic being responsive to said second portion of the parallel outputs of said address register on the same integrated circuit device therewith to provide a select signal whenever the code of the parallel signal appearing at said second portion of address register means is said certain value associated therewith, said gating means being responsive to the application thereto of said select signal and said read signal to provide said enabling signal on a coincident occurrence of said select signal and said read signal.

9. The invention according to claim 8 wherein the device select decoding means of each integrated circuit includes a disable input to which a signal is applied to prevent either of said first and second integrated circuit devices from providing a signal to said output line.

10. The invention according to claim 8 wherein said address and output shift register means each include metal-oxide-semiconductor switching devices operated by a four phase clock sequence and said matrix and device select decoding means include metal-oxide-semiconductor switching devices.

* * * * *